United States Patent

Martin

[15] 3,705,350
[45] Dec. 5, 1972

[54] ROTARY MAGNETIC DISC CIRCUIT INDICATOR

[72] Inventor: Robert L. Martin, 959 Calle Collado, Thousand Oaks, Calif. 91360

[22] Filed: Feb. 4, 1971

[21] Appl. No.: 112,571

[52] U.S. Cl. ................................. 324/133, 340/373
[51] Int. Cl. ................................................ G01r 19/14
[58] Field of Search ..................... 324/133; 340/373

[56] References Cited

UNITED STATES PATENTS

| | | | |
|---|---|---|---|
| 3,406,388 | 10/1968 | Pihl | 340/373 |
| 3,375,510 | 3/1968 | Pitches | 324/133 X |
| 2,367,299 | 1/1945 | McLarn et al. | 324/133 UX |
| 3,425,055 | 1/1969 | Pihl et al. | 340/373 |
| 3,430,170 | 2/1969 | Shatas et al. | 340/373 X |
| 3,480,863 | 11/1969 | Hopengarten | 324/133 |

*Primary Examiner*—Gerard R. Strecker
*Attorney*—Beehler, Arant & Jagger

[57] ABSTRACT

A magnetic disc with north and south poles and with alternating light and dark segments is rotatably mounted adjacent a stator having circumferentially spaced pole elements of like polarity near the respective north and south poles of the magnet. A translucent disc having circumferentially spaced light and dark segments matching the segments of the magnetic element is stationarily mounted over the magnetic element. When the magnetic element is in one position, the dark segments of the magnetic element underlie dark segments of the translucent disc and hence the over-all appearance is one of light and dark segments. When the stator is magnetized by energizing an electric coil mounted within it, the magnet is shifted rotatably a distance sufficient to have the dark segments of the magnet align with light segments of the translucent disc whereupon the over-all appearance of the device is completely dark in contrast with the appearance first mentioned. The difference in appearance is depended upon to indicate the energized or de-energized condition of an electric circuit connected to the coil.

8 Claims, 3 Drawing Figures

INVENTOR.
ROBERT L. MARTIN
By Beehler & Arant
ATTORNEYS.

PATENTED DEC 5 1972

INVENTOR.
ROBERT L. MARTIN
By Beehler & Arant
ATTORNEYS.

ROTARY MAGNETIC DISC CIRCUIT INDICATOR

Under the present state of the art visual indicators directed to a purpose comparable to the invention herein disclosed, namely testing the condition of an electric circuit, consist of visual indicators which are electrically actuated and mechanically latched after actuation. Such devices have been packaged in plastic cases of comparable size, as for example, 2/10 by 4/10 by 7/10 inches with lead wires molded in the case. The construction of available units limits operation of the indicator to environmental conditions far less severe than the conditions under which other circuit components of the system itself must operate. In view of this and further considering packaging requirements and techniques, an indicator is actually required that will meet the same environmental conditions as relays in the circuits in which the indicator is depended upon, and preferably packaged in the same size as the relay itself, the packaging of the indicator being preferably such as to occupy substantially a minimum amount of board area.

It is therefore among the objects of the invention to provide a new and improved rotary indicator which consists of relatively few parts of such construction and relationship as to be capable of being readily machined or stamped as low cost items.

Another object of the invention is to provide a new and improved rotary indicator consisting of no more than about 10 or 12 parts so constructed and designed that the assembly can be performed with simple jigs and fixtures for keeping the cost to a low figure and making the device also one of sufficiently great dependability to be attractive to both the commercial and military markets.

Still another object of the invention is to provide a new and improved rotary indicator of simple and inexpensive construction, and which by reason of being capable of assembly by use of simple jigs and fixtures provides a device of a high degree of reliability.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
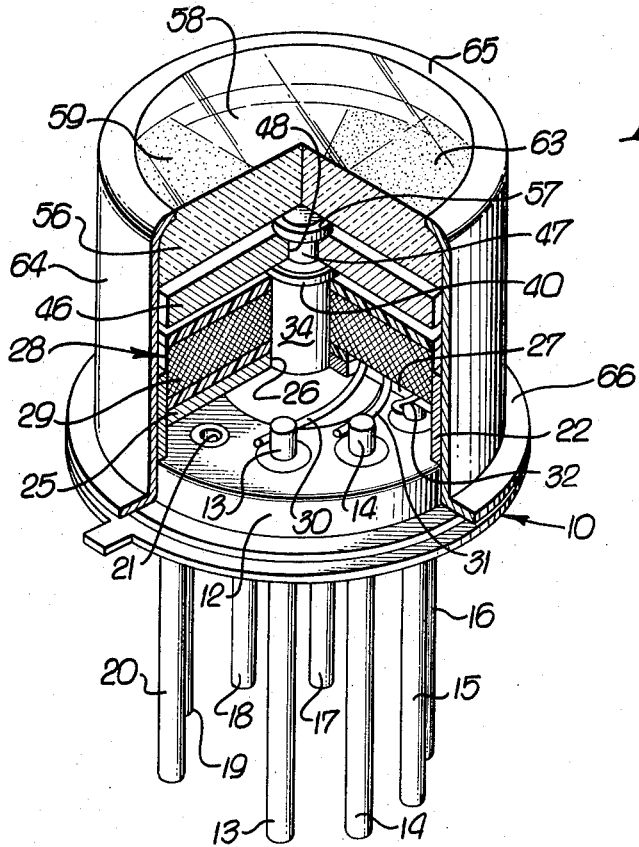
FIG. 1 is a side elevational view of the indicator cut away to reveal the interior construction.

In an embodiment of the invention chosen for the purpose of illustration there is shown a header indicated generally by the reference character 10 which consists of a mounting plate 11 supporting an annular ring 12 of insulating material on which are mounted a series of coil pins 13, 14, and 15, and a series of additional auxiliary pin contacts 16, 17, 18, 19, and 20. An opening 21 is provided for the purpose of drawing a vacuum when an hermetically sealed unit is desired.

Figure 2:
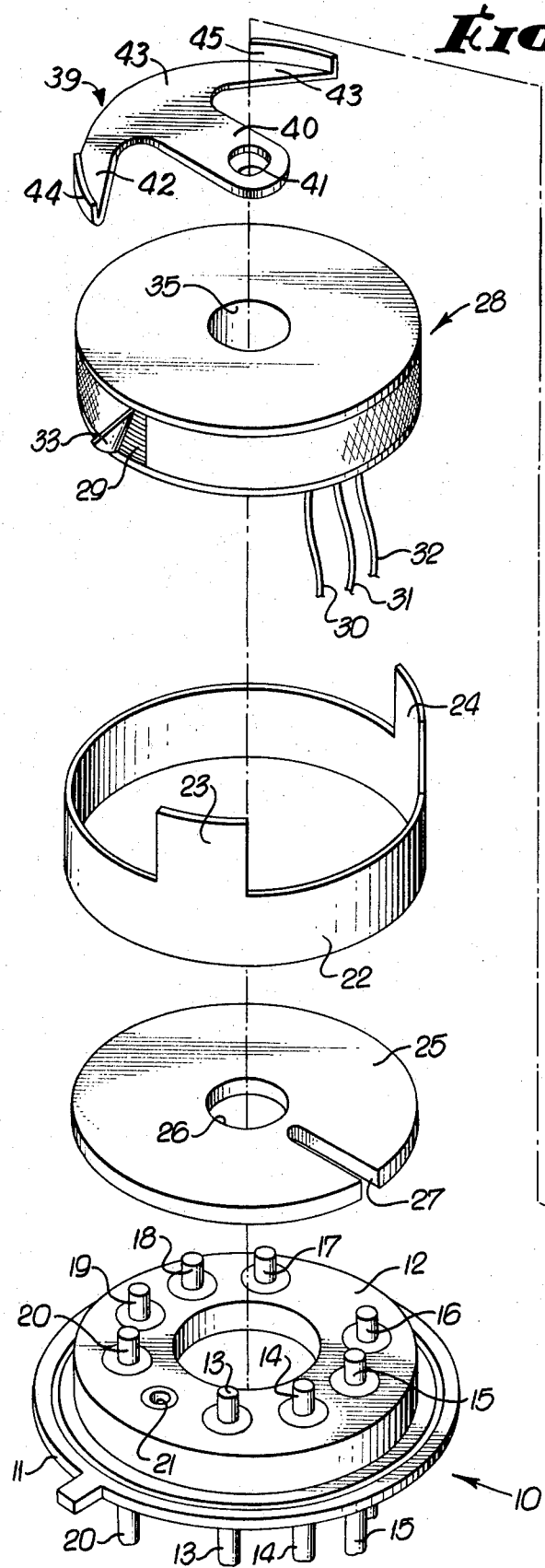
FIG. 2 is an exploded view showing all of the parts of the device and the manner in which they are arranged about a common longitudinal axis.
Figure 2:
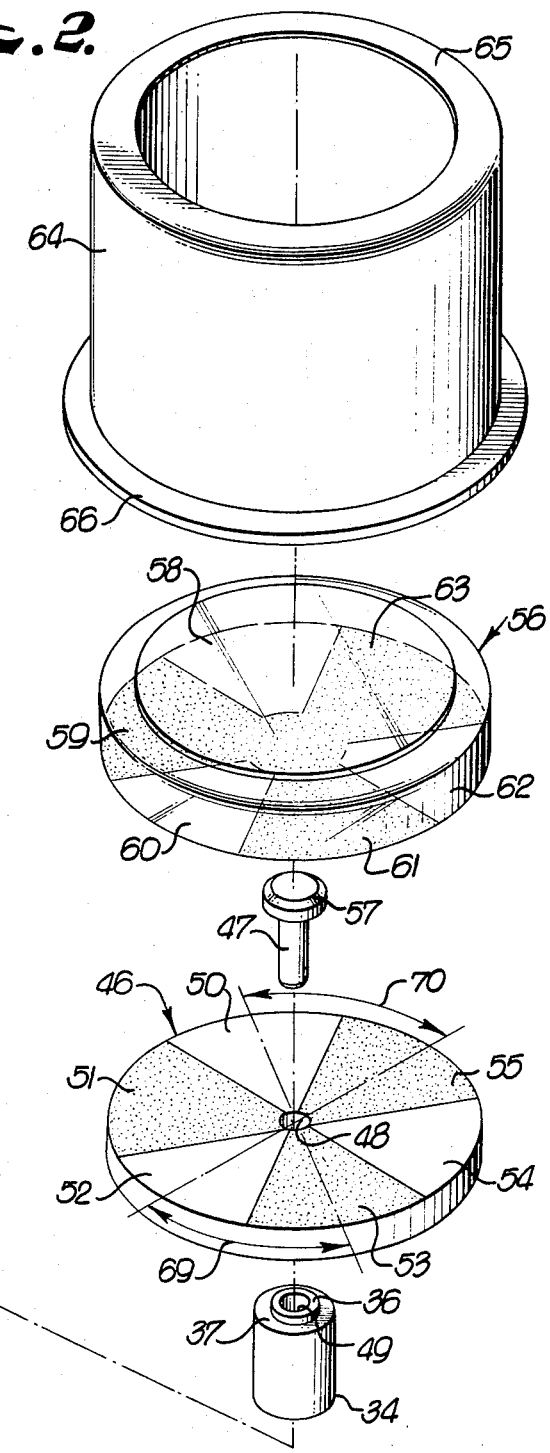

A stator 22 is tubular in form and has at an open upper end two north pole elements 23 and 24. At the lower end of the stator 22 as viewed in FIG. 2, there is provided a magnetic base 25 in the form of a circular disc which fits into and closes the lower end of the stator 22. The magnetic base 25 is provided with a central bore 26 and a radial slot 27, both extending entirely through the magnetic base 25. An electric coil form indicated generally by the reference character 28 has a coil 29 of wire wound around it and provided with coil leads 30, 31, and 32, there being an insulating tape 33 wrapped around the coil 29.

A core 34, serving as a central mounting element, extends into the bore 26 of the magnetic base 25 to which it is secured at the lower end of the core, the core extending upwardly through a bore 35 in the coil form 28, the core 34 having an upwardly extending bearing ring 36, around which is an annular shoulder 37.

A pole piece 39 has a radially extending arm 40 in which is a hole 41, the hole being adapted to fit around the bearing ring 36 whereby to mount the pole piece 39 on the core 34. Opposite perimetrally extending arms 42 and 43 are provided respectively with flanges 44 and 45 extending arcuately in a circumferential direction.

Above the pole piece 39 there is mounted a circular disc of magnetic material herein identified as a magnet 46. The magnet 46 is held in horizontal rotatable position by means of a pin 47 which extends through a central opening 48 in the magnet and thence downwardly into a bore 49 within the core 34.

Significantly, the magnet is divided into six somewhat pie-shaped areas 50, 51, 52, 53, 54, and 55. It is significant that three of the areas 50, 52, and 54 are light in color and are alternately spaced with three areas 51, 53, and 55 which are dark in color.

Mounted above the magnet 46 is a glass disc 56 which serves as a reference member. A head 57 on the pin 47 serves to space the glass disc 56 above the rotating magnet 46. The glass disc 56 is provided with six equal areas 58, 59, 60, 61, 62, and 63 corresponding substantially to the areas 50, 51, 52, 53, 54, 55 of the magnet 46. As shown, the areas 58, 60, and 62 are clear and the areas 59, 61, and 63 are opaque.

For mounting the glass disc 56 and for encapsulating the balance of the assembly there is provided a case 64 having an annular inwardly turned rim 65 at the upper end and an annular flange 66 at the lower end. The flange 66 is adapted to be applied against the upper face of the mounting plate 11 and fastened thereto by some appropriate means and the rim 65 is adapted to confine the glass disc 56 which lies beneath it.

Assembled as shown in FIG. 1, the coil lead 30 from one end of the coil 29 is attached to the coil pin 13. The lead 31 which is a common lead from a point in the coil winding intermediate opposite ends is attached to the coil pin 14 and the coil lead 32 from the other end of the coil is attached to the coil pin 15.

With the center tapped coil as shown, namely tapped by means of the common coil lead 31, the polarity of this connection, customarily identified as a common, remains the same and pulses of opposite polarity at leads 30 and 32 will activate the device to move the magnet 46 in one direction or another.

Space is provided between the upper face of the header 10 and the lower face of the magnetic base 25 to accommodate integrated circuit chips such as would provide desired inputs compatible with circuit failure to be indicated. The additional pins 16, 17, 18, 19 and 20 are provided for the purpose of making connections to such integrated circuits and for providing means to connect the device to a circuit board.

In operation the magnet 46 is permanently magnetized so as to create a north pole in the area 70 and a south pole in the area 69. Normally, the north pole is centered on the pole 70 element 24 of the stator 22 and the south pole 69 on flange 44 of the pole piece 39, and will remain centered between the pole element 24 and flange 44 due to the magnetic attraction of the north pole 70 of the magnet to the pole element 24, while the south pole 69 of the magnet is attracted to the flange 44 of the pole piece 39. Then coil A is energized with the proper polarity to form a north pole at pole elements 24 and 23 of the stator 22 and a south pole at flanges 44 and 45 of the pole piece 39. The magnetic path forming the poles when the coil 29 is energized consists of the core 34, the magnetic base 25, the stator 22, and the pole piece 39. This magnetic path produces a north pole 24 on the stator opposite the north pole 70 of the magnet 46 and a north pole on the pole element 23 adjacent the south pole 69 of the magnet 46 and south poles at flanges 44 and 45 of the pole piece 39. The south pole 69 of the magnet 46 will be attracted to the pole element 23 and repelled from the flange 44 and the north pole 70 of the magnet 46 will repell the north pole 24 of the stator 22 and will be attracted to the pole comprising the flange 45 causing rotation of the magnet 46 about the pin 47 until the south pole 69 of the magnet 46 is centered on the pole element 23 with the north pole 70 centered on the pole comprising the flange 45.

When the magnet is in one position, the visible pattern as viewed from the top of the indicator will be that of two colors because of dark areas 51, 53, and 55 of the magnet being in positions underlying opaque areas 59, 61, and 63 of the glass disc 56. This may be assumed to be the condition when one end of the coil 29 is energized, the condition being shown at the right of FIG. 3. When the opposite end of the coil 29 is energized, the magnet is rotated 60° to a second position wherein dark areas 51, 53, and 55 of the magnet 46 will underlie clear areas 58, 60 and 62 of the glass disc 56 and the visible pattern will be all the same, namely dark in color.

Figure 3:
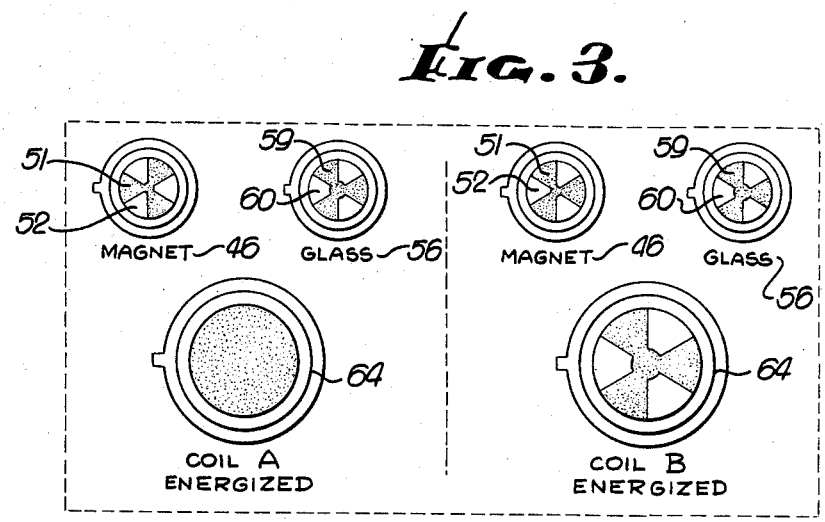
FIG. 3 is a schematic plan view illustrating how the parts of the device perform to illustrate different conditions in the circuit.

The same effect could be secured by using a coil with only two leads, one at each end, with the polarity of the coil reversed for the different indications. In FIG. 3 one end of the coil 25 has been designated coil A and the other end as coil B for purposes of convenience.

To provide some understanding of the physical capabilities of the indicator hereinabove described, attention is directed to the objectives achieved, namely a life of 500,000 operations, a duty cycle of 100%, a high operating ambient temperature of plus 125° C., a low operating ambient temperature of minus 65° C., no limit of altitude by reason of the fact that the device is hermetically sealed, resistance to vibration of from 30 G to 3,000 Hz and a resistance to shock of 50 g at 11 ms duration. A package for two of them as previously indicated will occupy less volume than .2 inches by .4 inches by .7 inches.

Having described the invention, what is claimed as new in support of Letters Patent is:

1. A rotary electric circuit indicator comprising a header having electric leads thereon, a stator assembly mounted on said header and comprising a tubular stator of magnetic material having a first set of circumferentially spaced pole elements adapted to be electrically energized to like polarity, a pole piece spaced from said station and having a second set of circumferentially spaced pole elements and an electric coil between said stator and said pole piece and connected to said leads, a magnet member having north and south pole elements rotatably mounted adjacent said sets of pole elements, said magnet member having circumferentially spaced are of contrasting visual character, a reference member stationarily mounted in a position overlying said magnet member, said reference member having circumferentially spaced areas of contrasting visual character similar to the areas of said magnet member, said magnet member having one rotary position between said first set of pole elements wherein like areas respectively on said magnet member and said reference member overlie each other and the relationship is productive of a net contrasting effect, said magnet member having another rotary position between said second set of pole elements wherein like areas on said magnet member and said reference member are in alternate positions and the relationship is productive of a net uniform visual effect, said magnet member being movable from one position to the other in response to changes in the electromagnetic condition of said stator and said pole elements.

2. A rotary electric circuit indicator as in claim 1 wherein the reference member is generally translucent and alternate areas thereon are generally opaque.

3. A rotary electric circuit indicator as in claim 1 wherein there are a plurality of light and dark areas comprising the areas of contrasting visual character on each respective member.

4. A rotary electric circuit indicator as in claim 1 wherein the coil has a separate lead at each end and common lead intermediate said ends whereby to enable energization of said coil with a polarity in alternatively different directions.

5. A rotary electric circuit indicator as in claim 1 wherein said stator has a magnetic base at the end adjacent said header and at a location spaced from and overlying said header, whereby to accommodate integrated circuit chips, and separate leads in said header for connection to such chips.

6. A rotary electric circuit indicator as in claim 1 wherein there is a core extending centrally through said coil and wherein said separate pole piece extends between said coil and said magnet member and has a section in engagement with said core, said second set of pole elements being part of said separate pole piece and located adjacent respective north and south pole elements of said magnet member.

7. A rotary electric circuit indicator as in claim 1 wherein there are three each of said areas of contrasting visual character and wherein the pole elements of said stator are spaced substantially 180° apart.

8. A rotary electric circuit indicator as in claim 1 wherein there is a tubular case attached to said header and surrounding said indicator, said reference member being a translucent member forming the end of said case remote from said header.

* * * * *